US011381642B2

(12) United States Patent
Fujino et al.

(10) Patent No.: US 11,381,642 B2
(45) Date of Patent: Jul. 5, 2022

(54) DISTRIBUTED STORAGE SYSTEM SUITABLE FOR SENSOR DATA

(71) Applicant: NIPPON TELEGRAPH AND TELEPHONE CORPORATION, Tokyo (JP)

(72) Inventors: Tomoyuki Fujino, Musashino (JP); Yui Yoshida, Musashino (JP); Keiichiro Kashiwagi, Musashino (JP); Hisaharu Ishii, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/760,886

(22) PCT Filed: Oct. 17, 2018

(86) PCT No.: PCT/JP2018/038689
§ 371 (c)(1),
(2) Date: Apr. 30, 2020

(87) PCT Pub. No.: WO2019/087786
PCT Pub. Date: May 9, 2019

(65) Prior Publication Data
US 2021/0185123 A1 Jun. 17, 2021

(30) Foreign Application Priority Data

Nov. 6, 2017 (JP) .............................. JP2017-213880

(51) Int. Cl.
*H04L 67/1097* (2022.01)
*H04L 67/562* (2022.01)
(52) U.S. Cl.
CPC ...... *H04L 67/1097* (2013.01); *H04L 67/2809* (2013.01)

(58) Field of Classification Search
CPC .................. H04L 67/1097; H04L 67/2809
See application file for complete search history.

(56) References Cited

U.S. PATENT DOCUMENTS 7,349,980 B1 * 3/2008 Darugar .................. H04L 67/02
709/238
9,935,932 B2 * 4/2018 Hansen .................. H04L 63/02
(Continued)

FOREIGN PATENT DOCUMENTS

JP      2011170572 A    9/2011
JP      2013192025 A    9/2013
(Continued)

OTHER PUBLICATIONS

Kohei Hiraga. et al., "Study on Redundancy Method of Metadata Server in Distributed File System", Research Reports of High Performance Computing (HPC) 2011.37 (2011): pp. 1-7.
(Continued)

*Primary Examiner* — Viet D Vu
(74) *Attorney, Agent, or Firm* — Harness, Dickey & Pierce, P.L.C.

(57) ABSTRACT

Data transmitted from an information transmission device can be stored in a distributed manner, without the need to duplicate or transmit/receive data among information storage devices. Under the control of a data write unit, end points to be assigned are determined in each of the information storage devices, based on the preset information indicating a correspondence between the information storage devices and end points assigned to the information storage devices. The data transmitted together with the identifier corresponding to the assigned end point is acquired from among the data transmitted from the information transmission devices, based on a first correspondence table stored in a shared setting storage unit for associating the end
(Continued)

points with the identifiers of the types of data acquired by the end points, and the acquired data is stored in the data storage unit.

12 Claims, 10 Drawing Sheets

(56) References Cited

U.S. PATENT DOCUMENTS

| | | | | |
|---|---|---|---|---|
| 2006/0101171 | A1* | 5/2006 | Grieff | G06F 13/387 |
| | | | | 710/36 |
| 2009/0122797 | A1* | 5/2009 | Thubert | H04W 40/246 |
| | | | | 370/392 |
| 2010/0125671 | A1* | 5/2010 | Thubert | H04W 4/38 |
| | | | | 709/230 |
| 2012/0163520 | A1* | 6/2012 | Liu | G01D 21/00 |
| | | | | 375/356 |
| 2012/0198075 | A1* | 8/2012 | Crowe | H04L 67/2885 |
| | | | | 709/226 |
| 2012/0233272 | A1* | 9/2012 | Bedi | G06F 9/542 |
| | | | | 709/206 |
| 2012/0303725 | A1 | 11/2012 | Sato et al. | |
| 2013/0198308 | A1* | 8/2013 | Yang | H04L 51/14 |
| | | | | 709/206 |
| 2015/0248443 | A1* | 9/2015 | Golander | G06F 16/22 |
| | | | | 707/770 |
| 2016/0210061 | A1 | 7/2016 | Soncodi et al. | |

FOREIGN PATENT DOCUMENTS

| | | |
|---|---|---|
| JP | 2014038483 A | 2/2014 |
| JP | 2014164382 A | 9/2014 |

OTHER PUBLICATIONS

Naoki Kondoh, et al. "Comparison experiment of performance for range queries using Fat-Btree, P-tree, SkipGraph", Information Fundamentals and Access Technology (IFAT) Technical Report, 2011.15 (2011): pp. 1-8.

International Search Report (English and Japanese) issued in PCT/JP2018/038689, dated Dec. 25, 2018; ISA/JP.

International Preliminary Report on Patentability from counterpart PCT/JP2018/038689, including the English translation of the Written Opinion, dated May 22, 2020.

* cited by examiner

|  | Topic #1 | Topic #2 | Topic #3 | Topic #4 |
|---|---|---|---|---|
| End point #1 |  | ○ |  |  |
| End point #2 | ○ | ○ |  |  |
| End point #3 | ○ |  |  | ○ |
| End point #4 |  | ○ | ○ | ○ |

FIG. 3

|  | Information storage device 1A | Information storage device 1B | Information storage device 1C | Information storage device 1D | Flag indicating end point in state of waiting for information storage device | Cost to end point |
|---|---|---|---|---|---|---|
| End point #1 | ○ |  |  | ○ |  | 6 |
| End point #2 |  | ○ | ○ |  |  | 8 |
| End point #3 |  |  | ○ | ○ |  | 4 |
| End point #4 | ○ | ○ |  |  |  | 6 |
| Time | 12345678 | 12345679 | 12345680 | 12345681 |  |  |

FIG. 4

|  | Information storage device 1A | Information storage device 1B | Information storage device 1C | Information storage device 1D | Flag indicating end point in state of waiting for information storage device | Cost to end point |
|---|---|---|---|---|---|---|
| End point #1 | ◎ | | | ○ | | 6 |
| End point #2 | | ○ | ○ | | | 8 |
| End point #3 | | | ○ | ○ | | 4 |
| End point #4 | ◎ | ○ | | | | 6 |
| Time | 12345678 | 12345679 | 12345680 | (10345681) | | |

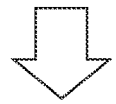

Time longer than predetermined value elapsed

|  | Information storage device 1A | Information storage device 1B | Information storage device 1C | Information storage device 1D | Flag indicating end point in state of waiting for information storage device | Cost to end point |
|---|---|---|---|---|---|---|
| End point #1 | ○ | | | ⊘ → ○ | | 6 |
| End point #2 | | ○ | ○ | | | 8 |
| End point #3 | | | ○ | ⊘ → ○ | | 4 |
| End point #4 | ○ | ○ | | | | 6 |
| Time | 12345678 | 12345679 | 12345680 | 10345681 | | |

F I G. 9

|  | Information storage device 1A | Information storage device 1B | Information storage device 1C | Information storage device 1D | Information storage device 1E | Flag indicating end point in state of waiting for information storage device | Cost to end point |
|---|---|---|---|---|---|---|---|
| End point #1 | ○ |  |  | ○ |  |  | 6 |
| End point #2 |  | ◎ | ○ |  | ○ |  | 8 |
| End point #3 |  |  | ○ | ○ |  |  | 4 |
| End point #4 | ○ | ○ |  |  |  |  | 6 |
| Total value of costs to information storage device | 12 | ⑭ | 12 | 10 | 8 |  |  |

F I G. 11

DISTRIBUTED STORAGE SYSTEM SUITABLE FOR SENSOR DATA

CROSS-REFERENCE TO RELATED APPLICATIONS

This is a U.S. national phase application under 35 USC 371 of international application PCT/JP2018/038689, filed Oct. 17, 2018, which claims priority to Japanese patent application No. 2017-213880, filed on Nov. 6, 2017. The entire disclosures of the above applications are incorporated herein by reference.

FIELD

The present invention relates generally to a distributed information storage system, method and program for storing data in a distributed manner.

BACKGROUND

An IoT system that has recently received attention requires a platform software program to accumulate all the data transmitted from many various sensor devices and to read arbitrary data from the accumulated data at any timing.

Most of the data transmitted from a sensor device in the IoT system is transmitted in small amounts at a high frequency. In general, such data is transmitted to the platform software program that performs aggregation, in accordance with a lightweight publisher-subscriber model messaging protocol, examples of which include Message Queueing Telemetry Transport (MQTT).

A sensor device may not have a permanent storage area, and there may not be any workers stationed around. It is therefore necessary to continuously and completely write data into the storage area in the platform software. To realize this, the platform software should ensure fault tolerance (see, for example, Non-patent Literature 1).

In addition, in the IoT system, more devices that have not been connected to the Internet are expected to be connected to the network. Furthermore, the entity that makes calls is not a user but a device. In view of this, the system is preferably designed to have scalability, beginning at a small scale and gradually expanding to a large-scale system (see, for example, Non-patent Literature 2).

CITATION LIST

Non-Patent Literature

[Non-patent Literature 1] Kohei Hiraga and Osamu Tatebe. "Study on Redundancy Method of Metadata Server in Distributed File System", Research Reports of High Performance Computing (HPC) 2011.37 (2011): 1-7.
[Non-patent Literature 2] Naoki Kondo, et al. "Comparison experiment of performance for range queries using Fat-Btree, P-tree, SkipGraph", Information Fundamentals and Access Technology (IFAT) Technical Report, 2011.15 (2011): 1-8.

SUMMARY

When storing data in a distributed manner, a distributed database in general stores the same data in a plurality of information storage devices and thereby ensures data redundancy, thereby attaining the above-described fault tolerance.

In a conventional distributed database as described in Non-patent Literature 1, in order to ensure data redundancy, the information storage device that has received data determines information storage devices for storing the data, and duplicates and sends this data. In such a distributed database, however, a process of duplicating data and transmitting and receiving the duplicated data is required, which may lower the write performance per information storage device, in comparison to a non-distributed database.

The present invention has been conceived in view of the above circumstances. The purpose of the invention is to offer a distributed information storage system, method and program for storing data transmitted from an information transmission device, in a distributed manner without the need to duplicate or transmit/receive the data between the information storage devices.

In order to solve the above problem, the invention according to the first mode is a distributed information storage system including a plurality of information storage devices configured to conduct data communication with information transmission devices and information reception devices, each information storage device of the information storage devices includes a data acquiring unit configured to acquire data transmitted together with an identifier corresponding to an Information reception device assigned to the information storage device from among data transmitted from the information transmission devices, based on a first correspondence table associating the information reception devices and identifiers indicating types of data acquired by the information reception devices and a second correspondence table indicating a correspondence between the information storage devices and the information reception devices assigned to the information storage devices, the first correspondence table and the second correspondence table being shared among the information storage devices, and a storage medium configured to store the acquired data.

In the invention according to the second mode, each of the information storage devices further includes a request acquiring unit configured to acquire a data request from the information reception device, a determining unit configured to determine whether or not the acquired data request is transmitted from the assigned information reception device, and an output unit configured to output data stored in the storage medium to the assigned information reception device when the acquired data request is determined as being acquired from the assigned information reception device, wherein the determining unit determines an information storage device responsible for an information reception device that is a sender of the data request based on the second correspondence table, when the acquired data request is not acquired from the assigned information reception device, each of the information storage devices further includes a relay unit configured to acquire data stored in the storage medium of the information storage device that is determined as the information storage device responsible for the information reception device that has sent the data request, and the output unit outputs the acquired data via the relay unit to the information reception device that has sent the data request.

In the invention according to the third mode, the distributed information storage system further includes a management device to implement the initial setting of, or data access to, the first correspondence table or the second correspondence table shared among the information storage devices.

In the invention according to the fourth mode, each of the information storage devices includes a correspondence updating unit to store, when an information reception device is added, the added information reception device in the second correspondence table without associating it with an information storage device; and a selecting unit to select an information reception device to be assigned from among the information reception devices that are not associated with any of the information storage devices, with reference to the second correspondence table, where the correspondence updating unit includes a correspondence updating unit to store the correspondence with the selected information reception device in the second correspondence table.

In the invention according to the fifth mode, the second correspondence table further stores a time point at which the correspondence with the information reception device is entered, for each of the information storage devices, each of the information storage devices further includes a correspondence monitoring unit configured to determine whether or not a predetermined time has elapsed after a time point is entered in relation to another information storage device responsible for the assigned information reception device, by referring to the second correspondence table, and a correspondence updating unit configured to, when it is determined that the predetermined time has elapsed after the time point is entered, clear the correspondence of the information storage device subjected to the determination with the information reception device from the second correspondence table, and update the time point entered in relation to the information storage device itself on the second correspondence table.

In the invention according to the sixth mode, each of the information storage devices further includes a calculation unit to calculate a total value of costs to the assigned information reception devices for each information storage device, on the second correspondence table; and when an information storage device is added to the distributed information storage system, the added information storage device further includes a selecting unit to select, as an information reception device to be assigned, an information reception device having the highest cost from among the information reception devices assigned to the information storage device having the largest total value of the calculated costs; and a correspondence updating unit to store correspondence with the selected information reception device in the second correspondence table.

The following additional modes may also be possible.

According to the first additional mode, after storing the correspondence in the second correspondence table in the sixth mode, the added information storage device sends a notification to the information storage device having the largest total value of the calculated costs.

According to the second additional mode, after storing the correspondence in the second correspondence table in the sixth mode, the added information storage device calculates the total value of the costs to the information reception devices associated with the information storage device itself, and determines whether or not the total value of the calculated costs exceeds a predetermined value.

According to the invention according to the first mode, in each of the information storage devices, the data transmitted together with the identifier associated with the information reception device assigned to the information storage device is acquired based on the first correspondence table shared among the information storage devices and also on the information indicating the correspondence, where the first correspondence table associates the information reception devices with the identifiers indicating the types of data acquired by the information reception devices, and the information indicates the correspondence between the information storage devices and the information reception devices assigned to the information storage devices. The acquired data is then stored. In other words, each information storage device autonomously acquires and accumulates the data to be acquired.

In this manner, with each information storage device configured to autonomously acquire data, the data can be stored in multiple information storage devices in a distributed manner, without having to duplicate or transmit/receive the data between the information storage devices. This realizes a distributed information storage system in which the write performance per information storage device during data storage is prevented from being lowered.

In addition, if the information indicating the correspondence between the information storage devices and the information reception devices assigned to the information storage devices is set such that one information reception device is assigned to two or more information storage devices, data redundancy can be ensured over a plurality of information storage devices, thereby assuring the fault tolerance of the distributed information storage system.

According to the invention according to the second mode, a data request is acquired in each of the information storage devices from the information reception devices, and whether or not the acquired data request is transmitted from an assigned information reception device is determined. Then, as a result of the determination, if the data request is transmitted from the assigned information reception device, the stored data is output to the assigned information reception device. On the other hand, if the data request is not from an assigned information reception device, the information storage device responsible for the information reception device that has sent the data request is determined, based on the second correspondence table that is shared among the information storage devices for associating the information reception devices with the information storage devices assigned to the information reception devices. Thereafter, the data stored in the information storage device determined as the information storage device responsible for the information reception device that has sent the data request is acquired and output to the information reception device that has sent the data request. The information reception device therefore can acquire the desired data, whichever information storage device the information reception device makes an access to.

In the invention according to the third mode, initial setting of, or data access to, a first correspondence table or a second correspondence table shared among the information storage devices is performed by a management device. This allows for collective management of information shared by information storage devices, or in other words collective management of the distributed information storage system, by the management device.

In the invention according to the fourth mode, when an information reception device is added, the added information reception device is stored in the second correspondence table in each of the information storage devices, without being associated with a specific information storage device. Thereafter, the second correspondence table is referred to in each of the information storage devices; an information reception device to be assigned is selected from the information reception devices which are not associated with any of the information storage devices; and the correspondence with the selected information reception device is stored in the second correspondence table.

Thus, according to the fourth mode, the system can be provided with a scaling-out property that allows an information reception device to be added to the system, without the need to transmit and receive data between the information storage devices at the time of scaling out. As a result, a distributed information storage system can be achieved which is provided with a scaling-out property and which can prevent the write performance per information storage device from being lowered even at the time of scaling out.

For conventional databases having a scaling-out property that allows for system expansion as described, for example, in Non-patent Literature 2, it is common to adopt hashing for keys and perform divide-and-conquer in accordance with the range of hash values or a subtree of a tree structure. With such a scheme, the data transmitted from an information transmission device is analyzed inside the database, an information storage device into which the information is to be written is searched for, and the writing is performed based on this result, onto the target information storage device. As described above, the conventional technology as described in Non-patent Literature 2 requires a process of transmitting and receiving information between information storage devices. Thus, in comparison to a non-distributed database, the amount of work at one write operation increases in proportion to the number of information storage devices, which lowers the write performance per information storage device. That is, the fourth mode has an advantageous feature as described above, over the prior art.

In the invention according to the fifth mode, each of the information storage devices refers to the second correspondence table, and determines whether or not a predetermined time has elapsed since the time stored for another information storage device that is responsible for the information reception device assigned to the information storage device itself. As a result of this determination, if a predetermined time has elapsed since the time stored, each of the information storage devices removes from the second correspondence table the correspondence between the Information storage device for which the time has elapsed and the information reception device, while updating the time stored for the information storage device itself.

In general, even if a normal operation has been confirmed for an information storage device, a problem may occur to cause the device to not operate properly as the operation time elapses. However, by removing the correspondence with the information storage device that has been associated with an information reception device with reference to the time as in the fifth mode described above, an information storage device that is not properly operating can be prevented from taking on responsibility for an information reception device. In this manner, the reliability of the entire distributed information storage system can be improved.

In addition, the operation of the information storage device that has performed the above process of monitoring the correspondence table is checked at the same time as the monitoring process. Thus, the correspondence with respect to a properly operating information storage device can be prevented from being removed when updating the time points in the second correspondence table as described above, and therefore the efficiency of the distributed information storage can be prevented from being lowered.

In the invention according to the sixth mode, each of the information storage devices calculates the total value of the costs to the information reception devices assigned to each information storage device in the second correspondence table. When an information storage device is added to the distributed information storage system, the added information storage device selects, as an information reception device to be assigned, the information reception device having the highest cost from among the information reception devices assigned to the information storage device having the total value of the largest total value of the calculated costs, and the correspondence with the selected information reception device is stored in the second correspondence table.

Thus, the system can be provided with a scaling-out property that allows for the addition of an information storage device to the system, without the need to transmit and receive data between the information storage devices at the time of scaling out. As a result, a distributed information storage system can be achieved which is provided with a scaling-out property and which can prevent the write performance per information storage device from being lowered even at the time of scaling out.

According to the first additional mode, after storing the correspondence in the second correspondence table in the sixth mode, the added information storage device sends a notification to the information storage device having the largest total value of the calculated costs. For this reason, the information storage device receiving the notification relinquishes the correspondence with the information reception device that is newly assigned to the added information storage device, so as to no longer receive the data for the information reception device with which the correspondence is relinquished. In this manner, the load of a heavily loaded information storage device can be reduced.

According to the second additional mode, after storing the correspondence in the second correspondence table in the sixth mode, the added information storage device calculates the total value of the costs to the information reception devices associated with the device itself, and determines whether or not the total value of the calculated costs exceeds a predetermined value. For this reason, an additional information reception device may be assigned depending on the determination result, thereby smoothing out the loads on the information storage devices.

That is, according to each mode of the present invention, a distributed information storage system, method, and program for distributing and staring the data transmitted from an information transmission device can be offered, without requiring duplication or transmission/reception of the data between information storage devices.

BRIEF DESCRIPTION OF THE DRAWINGS

FIG. 3 is a diagram showing an example of a first correspondence table for associating information reception devices with identifiers indicating types of data acquired, by respective information reception devices, which is shared among the setting management device and a plurality of information storage devices.

FIG. 4 is a diagram showing an example of a second correspondence table for associating information reception devices with information storage devices responsible for the information reception devices, which is shared among a setting management device and the information storage devices.

FIG. 9 is a diagram showing the state of the second correspondence table being updated in accordance with the correspondence monitoring process of FIG. 8.

FIG. 11 is a diagram showing the state of the second correspondence table being updated in accordance with the selection process of a to-be-assigned information reception device shown in FIG. 10.

DETAILED DESCRIPTION

Embodiments of the present invention will be described below with reference to the drawings.

Embodiment 1

(Structure)

Figure 1:
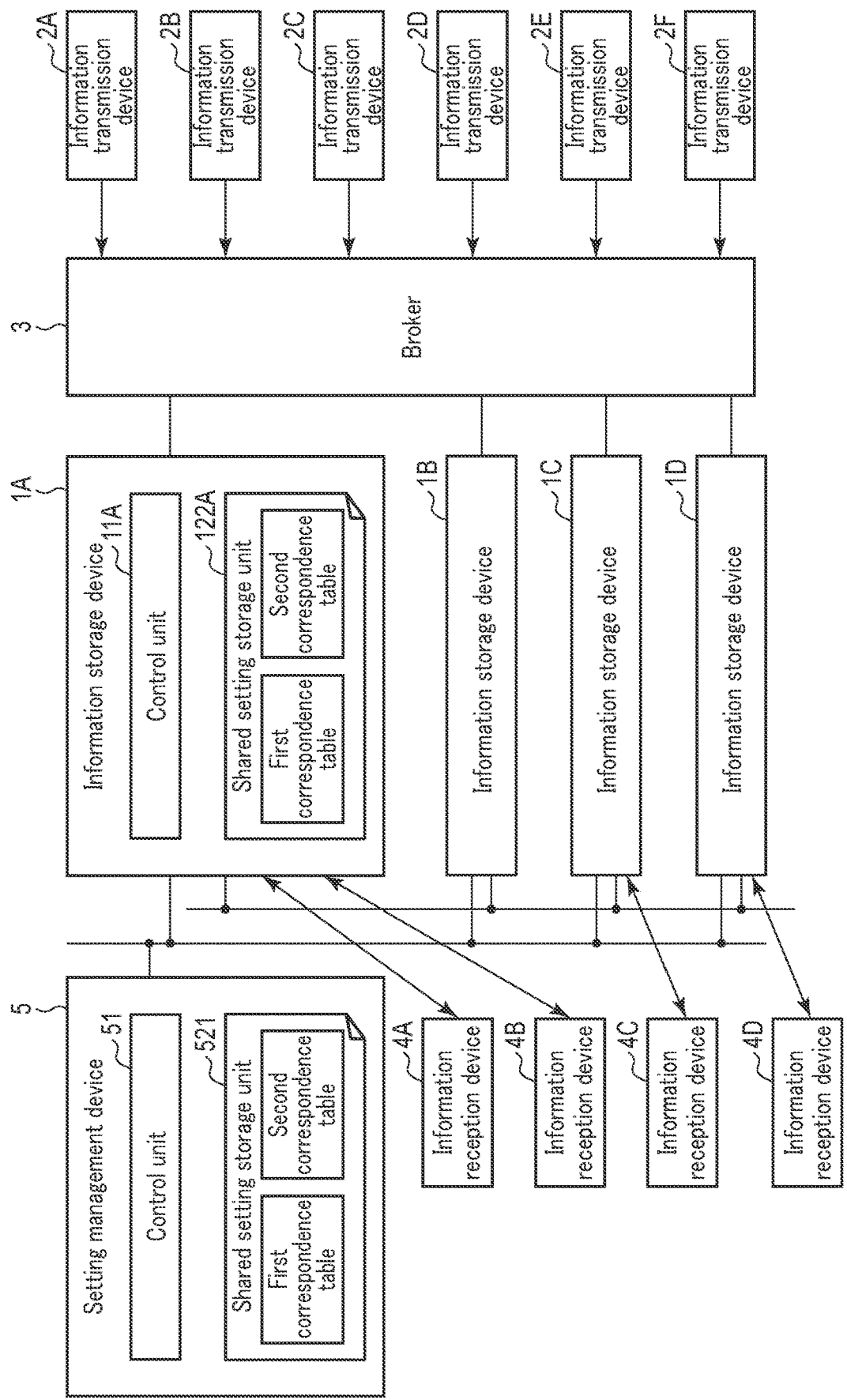
FIG. 1 is a schematic diagram showing the configuration of a network system in the invention according to the first embodiment.

FIG. 1 is a schematic diagram showing the configuration of a network system in the invention according to the first embodiment.

The network system of FIG. 1 includes information transmission devices 2A, 2B, 2C, 2D, 2E and 2F, which serve as sensor devices on the data transmission side, a broker 3, as well as information storage devices 1A, 1B, 1C and 1D and a setting management device 5, which serve as a distributed information storage system for storing transmission data, in a data communicable manner as in the publisher-subscriber model used in an IoT system. The network system may also include information reception devices 4A, 4B, 4C and 4D, which are applications, on the data reception side. The network system illustrated in FIG. 1 is merely given as an example. Any number (one or more) of information transmission devices and information reception devices may be present in the network system, and any number (two or more) of information storage devices may be present.

Each of the setting management device 5 and the information storage devices 1A, 1B, 1C and 1D stores therein a first correspondence table for associating the information reception devices with identifiers that indicate the types of data acquired by the information reception devices, and a second correspondence table for associating the information reception devices with the information storage devices responsible for the information reception devices to store data corresponding to the information reception devices. The first and second correspondence tables are shared in a synchronous manner among the setting management device 5 and the information storage devices 1A, 1B, 1C and 1D. The first and second correspondence tables may be initially set by an operator on the setting management device 5.

Of the data transmitted from the information transmission devices 2A, 2B, 2C, 2D, 2E and 2F, the information storage devices 1A, 1B, 1C and 1D store the data to be acquired by a respective one of the information reception devices 4A, 4B, 4C and 4D that is assigned to the respective information storage devices, based on the first correspondence table. When one information reception device is assigned to two or more information storage devices, the data to be acquired by this information reception device is divided and duplicated so chat the data can be stored in a distributed manner among the information storage devices.

Meanwhile, upon a data request from the information reception devices 4A, 4B, 4C and 4D, the corresponding information storage devices 1A, 1B, 1C and 1D transmit and receive data among the information storage devices 1A, 1B, 1C and 1D, as necessary, based on the second correspondence table, and output the data requested by the information reception devices 4A, 4B, 4C and 4D.

(1) Information Storage Device

Figure 2A:
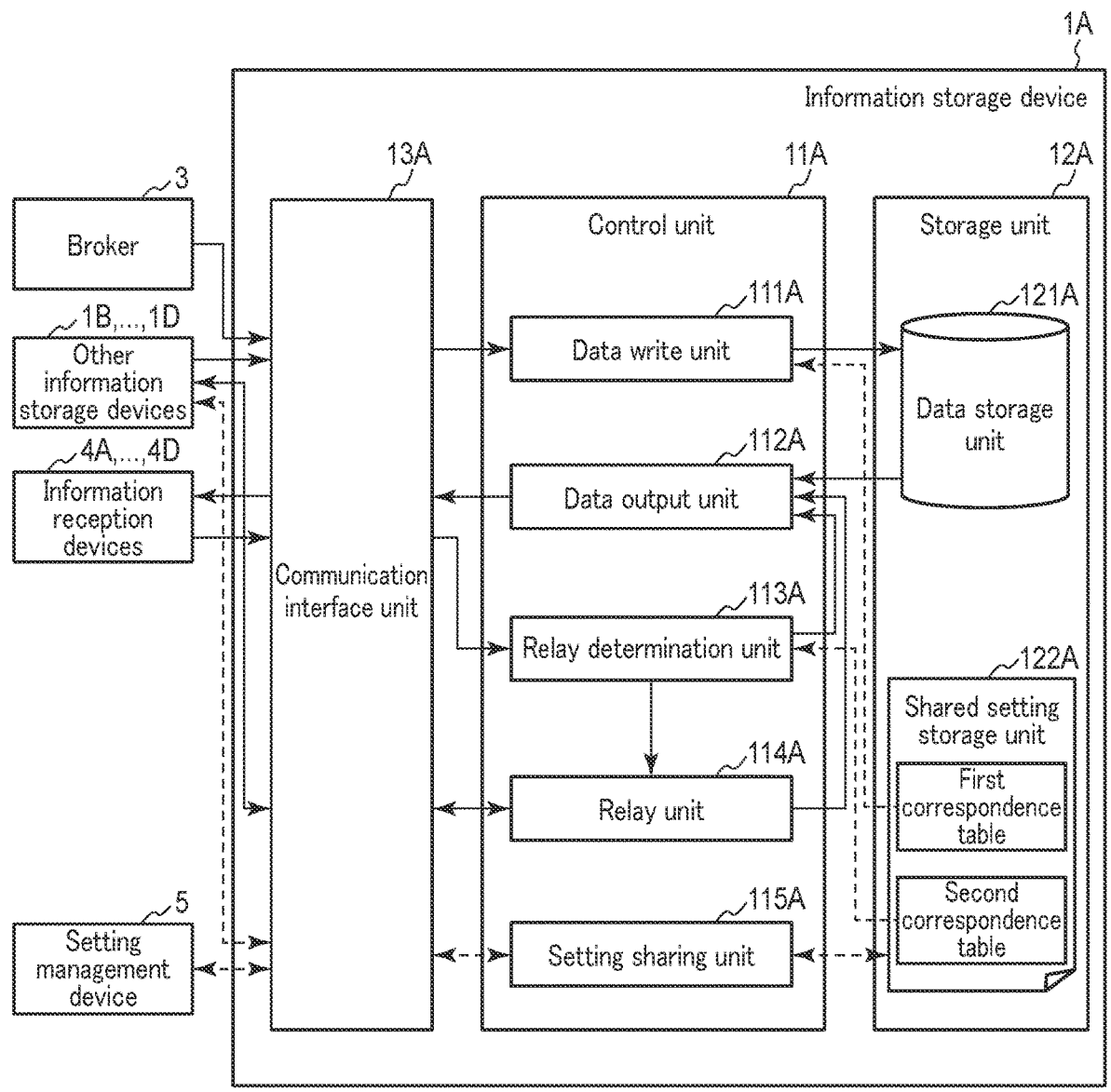
FIG. 2A is a block diagram showing the functional configuration of an information storage device in the network system illustrated in FIG. 1.

FIG. 2A is a block diagram showing the functional configuration of the information storage device 1A illustrated in FIG. 1. The functional configuration of the information storage device 1A is described below. It should be noted that other information storage devices such as the information storage devices 1B, 1C, and 1D have the same functional configuration. For reference, in FIG. 2A, the input and output of data are indicated by solid arrows, while the input and output of the setting information relating to the first and second correspondence tables are indicated by dashed arrows.

The information storage device 1A includes a control unit 11A, a storage unit 12A, and a communication interface unit 13A.

The communication interface unit 13A may include one or more wired or wireless communication interface units. The communication interface unit 13A acquires a data request having an identifier that indicates the type of data and is output from the control unit 11A, and outputs this data request to the broker 3 through the communication network. Thereafter, the communication interface unit 13A acquires the data transmitted together with, the identifier from the broker 3 through the communication network, from among the data transmitted by the information transmission devices 2A, 2B, 2C, 2D, 2E and 2F, and outputs the acquired data to the control unit 11A.

The communication interface unit 13A acquires the data request transmitted by the information reception devices 4A, 4B, 4C and 4D through the communication network, and outputs the acquired data request to the control unit 11A. Thereafter, the communication interface unit 13A transmits the data output from the control unit 11A, to the information reception device that has sent the data request through the communication network. The communication interface unit 13A also transmits and receives data and setting information to and from other information storage devices such as the information storage devices 1B, 1C, and 1D, and transmits and receives setting information to and from the setting management device 5.

For the storage unit 12A, a nonvolatile memory such as a hard disk drive (HDD) or a solid state drive (SSD) on which write and read operations can be performed at any time may be adopted as a storage medium. The storage unit 12A includes a data storage unit 121A and a shared setting storage unit 122A as storage areas used for realizing the present embodiment.

The data storage unit 121A is used for storing the data acquired from the broker 3 for respective information reception devices assigned to the information storage device that the data storage unit 121A belongs to.

The shared setting storage unit 122A is used for storing a first correspondence table for associating the information reception devices with the identifiers indicating the types of data acquired by the information reception devices, where the first correspondence table is shared among the information storage devices 1A, 1B, 1C and 1D and the setting management device 5. The shared setting storage unit 122A is further used for storing a second correspondence table for associating the information reception devices with the information storage devices 1A, 1B, 1C and 1D that are responsible for the information reception devices, where the second correspondence table is shared by the information storage devices 1A, 1B, 1C and 1D and the setting management device 5.

The control unit 11A includes a hardware processor such as a central processing unit (CPU) and a program memory. In order to implement the processing functions of the present embodiment, the control unit 11A has a data write unit 111A, a data output unit 112A, a relay determination unit 113A, a relay unit 114A, and a setting sharing unit 115A. All of the processing functions of these units can be realized by the hardware processor executing the programs stored in the program memory.

The data write unit 111A implements the process of reading the first correspondence table stored in the shared setting storage unit 122A of the storage unit 12A for associating the information reception devices with identifiers indicating the types of data acquired by the information reception devices. Thereafter, based on the first correspondence table and the preset information indicating the correspondence between the information storage devices and the information reception devices assigned to the information storage devices, the data write unit 111A implements the process of outputting to the broker 3 via the communication interface unit 13A the data request including the identifier that is associated with the information reception device assigned to the data storage device 1A of this data write unit 111A.

Then, the data write unit 111A implements the process of acquiring from the broker 3 via the communication interface unit 13A the data transmitted with the above identifier from among the data transmitted by the information transmission devices 2A, 2B, 2C, 2D, 2E and 2F, and storing the acquired data in the data storage unit 121A of the storage unit 12A for each of the assigned information reception devices. The data for an information reception device assigned to the information storage device 1A may be acquired by other information storage devices 1E, . . . , and 1D based on the first correspondence table. The data write unit 111A may acquire this data from the information storage device that has acquired the data, and store the data in the data storage unit 121A of the storage unit 12A.

The information indicating the correspondence between the information storage device and the information reception device assigned to the information storage device may be the information indicating a correspondence preselected by the setting management device 5, or the information indicating the correspondence selected by the setting sharing unit 1152A of the control unit 11A. The information indicating the correspondence between the aforementioned information storage device and the information reception device assigned to the information storage device may include the correspondence for other information storage devices such as information storage devices 1B, 1C and 1B.

The relay determination unit 113A implements the process of acquiring, via the communication interface unit 13A, the data request transmitted together with an identifier indicating an information reception device from among the information reception devices including the information reception devices 4A, 4B, 4C and 4D. In the following explanation, it is assumed that a data request is acquired from the information reception device 4A as an example.

Then, the relay determination unit 113A implements the process of determining whether or not the acquired data request is transmitted from the information reception device assigned to the information storage device 1A of the relay determination unit 113A itself. This determination process may be based on the aforementioned information indicating the correspondence between the information storage devices and the information reception devices assigned to the information storage devices. Alternatively, the determination processing may be based on the second correspondence table stored in the shared setting storage unit 122A of the storage unit 12A for associating the information reception devices with the information storage devices responsible for the information reception devices. The relay determination unit 113A implements, if it is determined that the acquired data request is not from the information reception device assigned to the information storage device 1A that the relay determination unit 113A belongs to, the process of determining the information storage device responsible for the information reception device 4A which has sent the data request, based on the second correspondence table stored in the shared setting storage unit 122A of the storage unit 12A. In the following explanation, as an example, it is assumed that the information storage device 1B is determined as the information storage device responsible for the information reception device 4A that has sent the data request.

The relay unit 114A implements, when it is determined that the acquired data request is not from the information reception device assigned to the information storage device 1A that the relay unit 114A belongs to, the process for outputting the data request via the communication interface unit 13A to the information storage device 1B that is determined as the information storage device responsible for the information reception device 4A that has sent the data request. Thereafter, the relay unit 114A implements the process for acquiring the data stored in the data storage unit 121B of the information storage device 1B via the communication interface unit 13A. The acquired data may be stored in the storage unit 12A. Instead of outputting the data request to the information storage device 1B that serves as a relay point, the relay unit 114A may issue a command to transmit the data stored for the information reception device 4A in the data storage unit 121B of the information storage device 1B.

The data output 112A implements, if it is determined that the acquired data request is not from the information reception device assigned to the information storage device 1A that the data output unit 112A belongs to, the process for outputting the data acquired through the processing at the relay unit 114A, to the information reception device 4A via the communication interface unit 13A. On the other hand, the data output unit 112A implements, if it is determined that the acquired data request is transmitted from the information reception device assigned to the information storage device 1A that the data output unit 112A belongs to, the process for reading the data stored in the data storage unit 121A of the storage unit 12A for the information reception device 4A that has sent the data request. Thereafter, the data output unit 112A implements the process for outputting the read-out data to the information reception device 4A via the communication interface unit 13A.

The setting sharing unit 115A implements the process for keeping the first and second correspondence tables stored in the shared setting storage unit 122A of the storage unit 12A in synchronization with each other in accordance with the initial setting or data access that has been performed by the setting management device 5 on the first or second correspondence table stored in the shared setting storage unit 521 of the setting management device 5.

If the first correspondence table or the second correspondence table stored in the shared setting storage unit 122A of the storage unit 12A is updated, the setting sharing unit 115A further implements the processing for outputting, via the communication interface unit 13A, the setting information that is stored in the setting management device 5 and the information storage devices 1B, 1C and 1D and used for keeping the first correspondence table and second correspondence table is stored in the setting management device 5 and the information storage devices 1B, 1C and 1D in synchronization with each other.

Figure 2B:
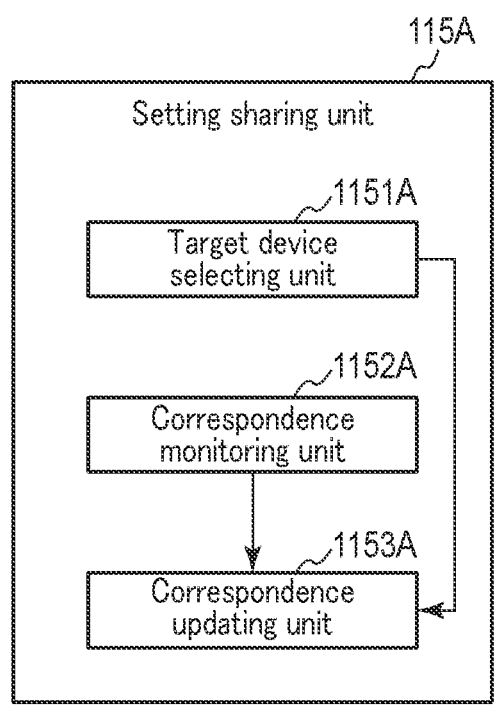
FIG. 2B is a block diagram showing a detailed functional configuration of a setting sharing unit illustrated in FIG. 2A.

FIG. 2B is a block diagram showing the detailed functional configuration of the setting sharing unit 115A. The setting sharing unit 115A includes a target device selecting unit 1151A, a correspondence monitoring unit 1152A, and a correspondence updating unit 1153A.

The target device selecting unit 1151A implements the process of selecting an information reception device to be assigned to the information storage device 1A that the target device selecting unit 1151A belongs to. This selection process may be implemented by referring to the second correspondence table stored in the shared setting storage unit 122A of the storage unit 12A. The target device selecting unit 1151A may execute a process of selecting an information reception device, assigned to an information storage device other than the information storage device 1A that the target device selecting unit 1151A belongs to.

The correspondence monitoring unit 1152A implements the process of monitoring the second correspondence table stored in the shared setting storage unit 122A of the storage unit 12A.

The correspondence updating unit 1153A implements the update process for writing, into the second correspondence table stored in the shared setting storage unit 122A of the storage unit 12A, the correspondence between the information storage device 1A that the correspondence updating unit 1153A belongs to and the information reception device selected by the target device selecting unit 1151A or the setting management device 5, after the completion of the data write process by the data write unit 111A. The correspondence updating unit 1153A further implements the process of updating the second correspondence table stored in the shared setting storage unit 122A of the storage unit 12A in accordance with the monitoring process performed by the correspondence monitoring unit 1152A.

(2) Correspondence Table

FIG. 3 provides an example of the first correspondence table shared among the setting management device 5 and the information storage devices 1A, 1B, 1C and 1D. The first correspondence table associates the information reception devices with identifiers indicating the types of data acquired by the information reception devices. In the example of the first correspondence table in FIG. 3, the correspondence of end points #1, #2, #3 and #4, which correspond to the identifiers indicating the information reception devices 4A, 4B, 4C and 4D, with the types of data corresponding to the identifiers indicating topics #1, #2, #3 and 4, is stored.

FIG. 4 provides an example of the second correspondence table shared between the setting management device 5 and the information storage devices 1A, 1B, 1C and 1D. The second correspondence table associates the information reception devices with the information storage devices assigned to these information reception devices. In the example of the second correspondence table in FIG. 4, the correspondence of the end points #1, #2, #3 and #4 that correspond to the identifiers indicating the information reception devices 4A, 4E, 4C and 4D and the information storage devices 1A, 1B, 1C and 1D is stored.

In addition, in the example of the second correspondence table in FIG. 4, the latest time point at which the correspondence of the information storage devices 1A, 1B, 1C and 1D with any of the end points is established is stored. A standby flag may also be stored to indicate an end point being in a standby state for the correspondence with an information storage device. In the example of the second correspondence table shown in FIG. 4, the cost is further stored for each end point. The cost at an end point represents, for example, the frequency of access to the end point per unit time and the amount of processing per unit time that increases for the information storage device by handling this end point.

(Operation)

Next, the operation of information storage devices configured as described above, including the information storage devices 1A, 1B, 1C and 1D, will be explained.

In the following explanation, the operation of the information storage device 1A will be discussed as an example. However, any step of the operation flow described below may be performed by any information storage device other than the information storage device 1A. In the operation flow described below, the use of the first correspondence table of FIG. 3 and the second correspondence table of FIG. 4 will be described as an example. In FIGS. 3 and 4, the end points #1, #2, #3 and #4 correspond to the identifiers indicating the information reception devices 4A, 4B, 4C and 4D, respectively. In a similar manner, the information reception device 4A and end point #1, the information reception device 4B and end point #2, the information reception device 4C and end point #3, and the information reception device 4D and end point #4, are regarded as synonymous.

(1) Data Write Process

Figure 5:
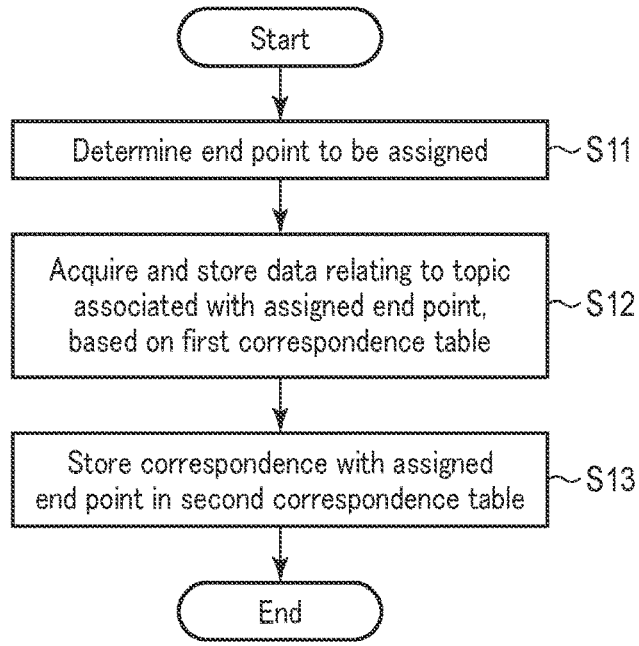
FIG. 5 is a flowchart showing an example of a data write process implemented by the control unit of the information storage device illustrated in FIG. 2.

FIG. 5 is a flowchart showing an example of the data write process implemented by the control unit 11A of the Information storage device 1A in FIG. 2.

First, at step S11, the control unit 11A determines the end point to be assigned to the information storage device 1A that the control unit 11A belongs to, based on the preset information indicating the correspondence between the information storage devices and the end points assigned to the information storage devices, under the control of the data write unit 111A. Hereinafter, a situation will be described in which the end point #1 is determined as the end point to be assigned to the information storage device 1A.

The information indicating the correspondence between the information storage device and the end point assigned to the information storage device may be the information indicating a correspondence preselected by the setting management device 5, or the information indicating the correspondence selected by the setting sharing unit 115A of the control unit 11A.

If the second correspondence table associating the end points and the information storage devices responsible for the end points is initially set by the setting management device 5, the aforementioned information indicating the correspondence between the storage devices and the end points assigned to the information storage devices may be information from the second correspondence table.

At step S12, the control unit 11A reads, under the control of the data write unit 111A, the first correspondence table stored in the shared setting storage unit 122A to associate the end points with identifiers indicating the types of data acquired by the end points. Then, under the control of the data write unit 111A, the control unit 11A acquires, based on the first correspondence table, data transmitted together with the identifier indicating the topic #2 associated with the end point #1 from the broker 3, from among the data transmitted by the information transmission devices 2A, 2B, 2C, 2D, 2E and 2F, and stores the acquired data in the data storage unit 121A of the storage unit 12A.

One of the features of this technique resides in storing, in the first correspondence table, the correspondence between end points representing the reception devices and topics that are identifiers representing the types and structures of abstract data for each data generating sensor or device, which is requested by a reception device; storing, in the second correspondence table, the correspondence between the end points representing the reception devices and the specific information storage devices that store the data requested by the reception devices; and associating the correspondence tables 1 and 2.

In the determination of the allocation of information storage devices that store data in the data write process, a storage device responsible for the data storage can be automatically determined simply by updating and maintaining the second correspondence table based only on the information on the correspondence between the reception devices and information storage devices, without the need to consider the information of specific data generation devices that are added to the IoT system or removed from the IoT system. This allows for the provision of a distributed storage mechanism by a simple structure.

In addition, when adding a new data generator to the IoT system or changing the type of data requested by the information reception device, it is possible to reflect the change in the connected data generator or in the data requested by the data reception device by updating the first correspondence table, without, the need to consider the configuration of the information storage devices.

When there is a change in the data generators or the type of data requested by a reception device, the first correspondence table is updated. When there is a change in the configuration such as addition of a reception device or storage device, the second correspondence table is referred to and changed to determine the allocation of storage devices. In this manner, the automatic data distribution and storage in a plurality of storage devices can be realized with a simple mechanism, with a change in the configuration of the system constituting devices being reflected and also a change in the requested data being reflected.

In the process of connecting a new sensor or the like to the IoT system, only the maintenance of the first correspondence table is needed. In the process of assigning storage devices in a distributed manner when a new information reception device is added, only the maintenance of the second correspondence table is needed. This facilitates the implementation of the processes.

By combining the first correspondence table and the second correspondence table, updating of the devices and the distribution and allocation of the storage can be automated. Thus, an advantageous feature of the present invention resides in the reduced maintenance and management load of the distributed storage system.

In the process of writing to the data storage unit 121A, a key for uniquely identifying data corresponding to an end point may be provided and stored for each assigned end point. The key may be stored in the first correspondence table so as to be commonly used among all the information storage devices and the setting management device 5.

At step S13, under the control of the correspondence updating unit 1153A, the control unit 11A writes the correspondence between the information storage device 1A and the assigned end point #1 in the second correspondence table stored in the shared setting storage unit 122A. The result, is shown in the second correspondence table of FIG. 4, in which a circle ("○") is entered to indicate that the information storage device 1A is associated with the end point #1. This second correspondence table is shared among all the storage devices and the setting management device 5.

(2) Data Request Response Process

Figure 6:
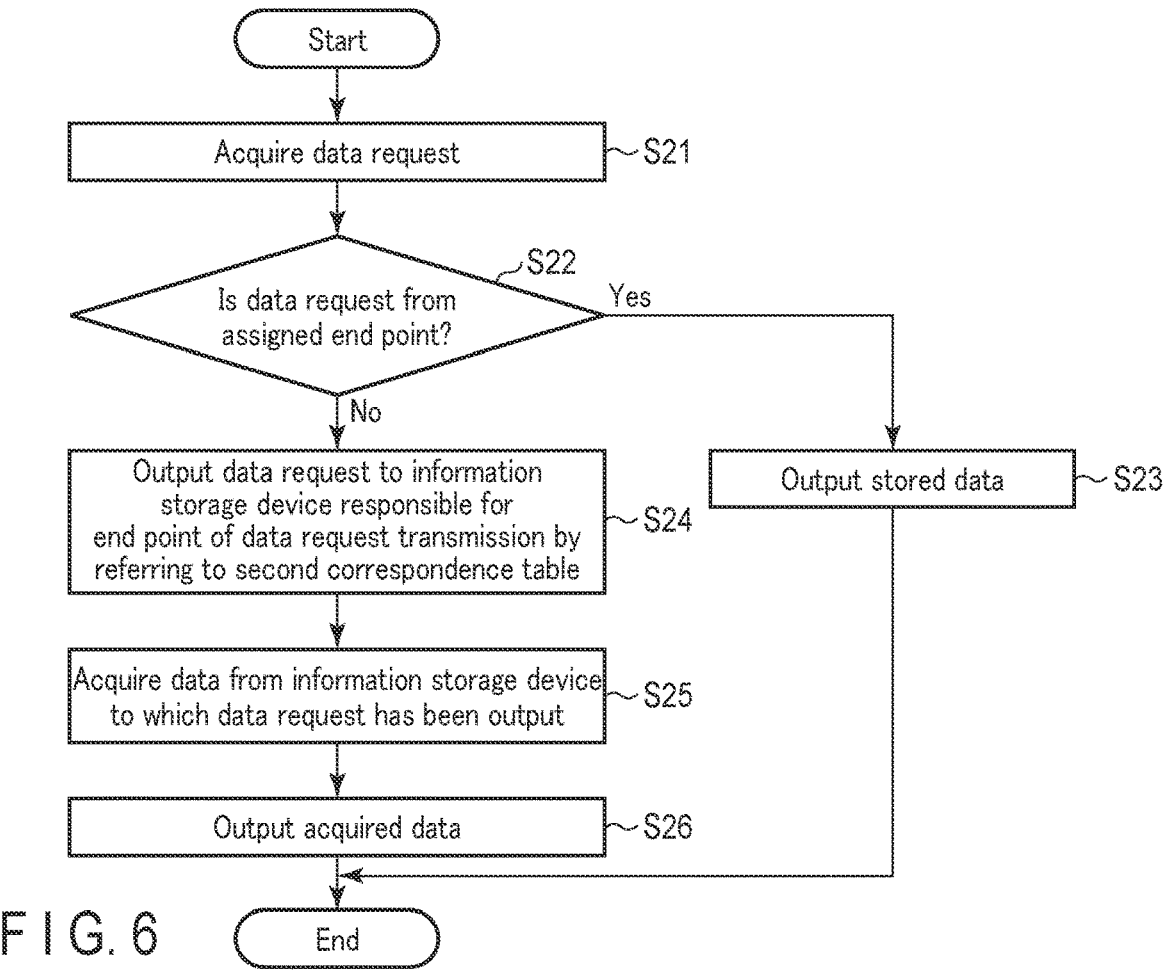
FIG. 6 is a flowchart showing a data request response process implemented by the control unit of the information storage device illustrated in FIG. 2.

FIG. 6 is a flowchart showing an example of a data request response process implemented by the control unit 11A of the information storage device 1A in FIG. 2.

First, at step S21, the control unit 11A receives, under control of the relay determination unit 113A, a data request transmitted from an information reception device such as the information reception device 4A, 4B, 4C or 4D, together with an identifier indicating this information reception device.

At step S22, the control unit 11A determines, under the control of the relay determination unit 113A, whether or not the acquired data request is transmitted from an end point assigned to the information storage device 1A that the control unit 11A belongs to. This determination process may be based on the information indicating the correspondence between the information storage devices and the end points assigned to the information storage devices as described in relation to step S11. Alternatively, the determination process may be performed with reference to the second correspondence table stored in the shared setting storage unit 122A.

The control unit 11A reads, if it is determined that the acquired data request is transmitted, for example, from the end point #1 assigned to the Information storage device 1A that the control unit 11A belongs to, the data stored in the data storage unit 121A for the end point #1, and outputs the read-out data to the information reception device 4A corresponding to the end point #1 that has sent the data request, under the control of the data output unit 112A at step S23.

In contrast, if it is determined that the acquired data request is transmitted, for example, from the end point #2, which is not assigned to the information storage device 1A, the control unit 11A determines, based on the second correspondence table stored in the shared setting storage unit 122A, the information storage device responsible for the end point #2 that has sent the data request, under the control of the relay determination unit 113A at step S24. Thereafter, under the control of the relay unit 114A, the control unit 11A outputs the data request to at least one of the information storage device 1B and the information storage device 1C determined as the information storage devices responsible for the end point #2 that has sent the data request.

At step S25, under the control of the relay unit 114A, the control unit 11A acquires the data stored in at least one of the information storage device 1B and the information storage device 1C responsible for the end point #2 that has sent the data request.

At step S26, the control unit 11A outputs the acquired data to the information reception device 4B corresponding to the end point #2 that has sent the data request, under the control of the data output unit 112A.

Figure 7:
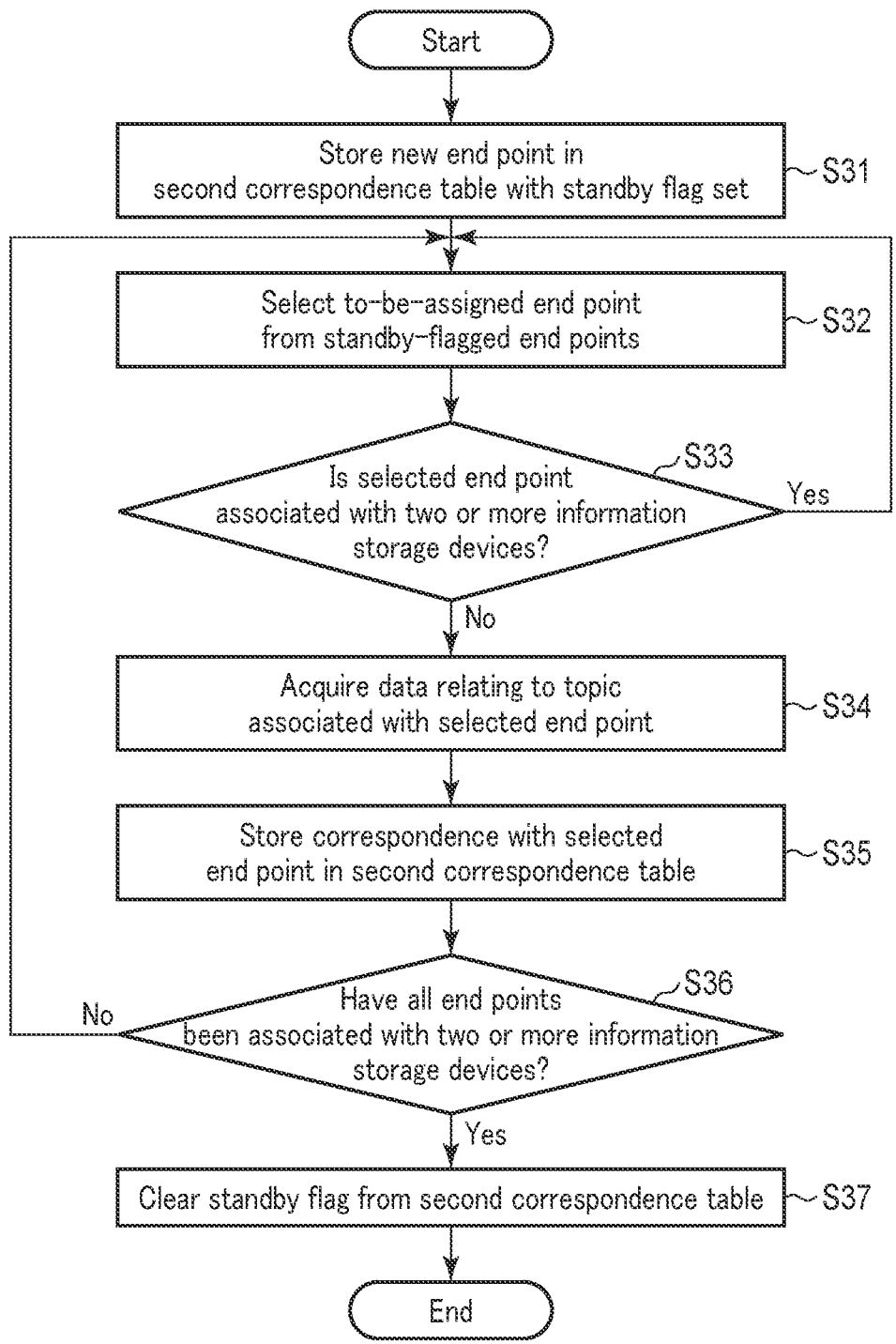
FIG. 7 is a flowchart showing an example of a selection process implemented by the control unit of the information storage device illustrated in FIG. 2 for selecting, when an information reception device is added to the network system illustrated in FIG. 1, a to-be-assigned information reception device.

(3) Selecting Process for Allocation of Information Reception Devices when New Information Reception Device is Added FIG. 7 is a flowchart showing an example of a process of selecting an information reception device to be assigned, where the process is implemented by the control unit 11A of the information storage device 1A in FIG. 2 when an information reception device is added to the network system of FIG. 1.

When an information reception device 4E is to be added to the network system, first of all, the control unit 11A adds a row or column for an end point #5 corresponding to the information reception device 4E to the second correspondence table stored in the shared setting storage unit 122A under the control of the correspondence updating unit 1153A at step S31. Here, the correspondence with regard to an information storage device is not entered, and a standby flag is set.

The control unit 13A may add a row or a column for the end point #5 to the first correspondence table stored in the shared setting storage unit 122A, under the control of the correspondence updating unit 1153A. In the first correspondence table, an identifier indicating the type of to-be-acquired data that is sent, for example, from the information reception device 4E may be stored in association with the added end point #5.

Subsequently, at step S32, the control unit 11A reads the second correspondence table stored in the shared setting storage unit 122A, and selects an end point to be assigned from among end points for which a standby flag is set, under the control of the target device selecting unit 1151A. The selection process may be random selection from the end points with a standby flag being set.

Next, at step S33, the control unit 11A determines whether or not the selected end point is associated with two or more information storage devices on the second correspondence table stored in the shared setting storage unit 122A, under the control of the target device selecting unit 1151A. If it is determined that the selected end point is associated with two or more information storage devices, the process of step S32 is repeated.

On the other hand, if it is determined that the selected end point is not associated with two or more information storage devices, the control unit 11A acquires the data transmitted together with an identifier associated with the selected end point, from among the data transmitted by the information transmission devices 2A, 2B, 2C, 2D, 2E and 2F, based on the first correspondence table stored in the setting storage unit 122A, under the control of the data write unit 111A at step S34.

Thereafter, at step S35, the control unit 11A writes the correspondence between the information storage device 1A and the selected end point into the second correspondence table stored in the shared setting storage unit 122A, under the control of the correspondence updating unit 1153A.

At step S36, the control unit 11A determines whether or not all of the end points are associated with two or more information storage devices on the second correspondence table stored in the shared setting storage unit 122A, under the control of the target device selecting unit 1151A. If it is determined that there is an end point that is not yet associated with two or more information storage devices, the processing of step S32 and after is repeated.

In contrast, if it is determined that all of the end points are associated with two or more information storage devices, the control unit 11A clears the standby flags from the second correspondence table stored in the shared setting storage unit 122A, under the control of the correspondence updating unit 1153A at step S37.

(4) Correspondence Monitoring Process

Figure 8:
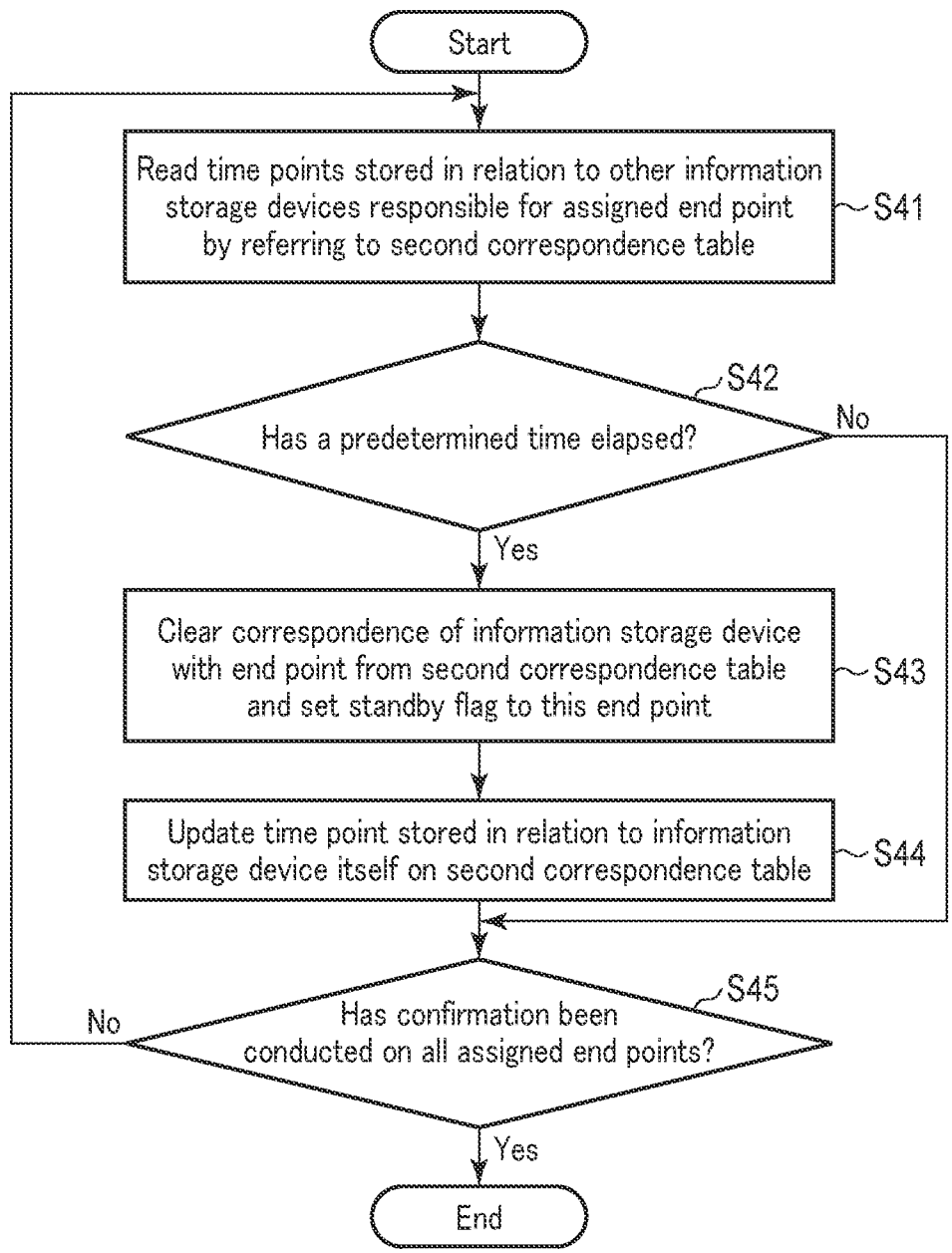
FIG. 8 is a flowchart showing an example of a correspondence monitoring process implemented by the control unit of the information storage, device illustrated in FIG. 2.

FIG. 8 is a flowchart showing an example of a correspondence monitoring process implemented by the control unit 11A of the information storage device 1A in FIG. 2. FIG. 9 is a diagram showing the state of updating the second correspondence table of FIG. 4 in accordance with the correspondence monitoring process of FIG. 8.

First, at step S41, the control unit 11A refers to the second correspondence table stored in the shared setting storage unit 122A, and reads the time point "10345681" stored in relation to the information storage device 1D that is another information storage device responsible for the assigned end point #1, and the time point "12345679" stored in relation to the information storage device 1B that is another information storage device responsible for the assigned end point #4, under the control of the correspondence monitoring unit 1152A.

At step S42, the control unit 11A determines, with regard to the read time points "12345679" and "10345681" as shown in FIG. 9, whether or not a predetermined time has elapsed since the time points were entered, under the control of the correspondence monitoring unit 1152A. For the time point "12345679" stored for the information storage device 1B, it is determined that a predetermined time has not yet elapsed, whereas for the time point "10345681" stored for the information storage device 1D, it is determined that the predetermined time has already elapsed.

At step S43, the control unit 11A clears the correspondence of the end point with the information storage device 1D relating to the time point "10345681", from which a predetermined time has elapsed, on the second correspondence table stored in the shared setting storage unit 122A in FIG. 9, and sets a standby flag for the end points #1 and #3, for which the correspondence has been cleared, under the control of the correspondence updating unit 1153A.

At step S44, the control unit 11A updates the time point "12345678" that is entered in the second correspondence table stored in the shared setting storage unit 122A with respect to the information storage device 1A, which is the information storage device that the control unit 11A belongs to, under the control of the correspondence updating unit 1153A. The update process may be implemented even when it is determined at step S42 that the predetermined time has not elapsed with regard to all the read-out time points.

At step S45, the control unit 11A refers to the second correspondence table stored in the shared setting storage unit 122A, and determines whether or not the time confirmation process as described above has been implemented for all the assigned end points, under the control of the correspondence monitoring unit 1152A. As a result of this determination, if there is any end point for which the time confirmation process has not yet been implemented, the processing of step S41 and after is repeated for this end point.

The processing of steps S41 to S45 may be implemented at different timings, for example at regular intervals, among the information storage devices 1A, 1B, 1C and 1D, based on a clock synchronized among the information storage devices 1A, 1B, 1C and 1D.

In relation to the end points for which a standby flag is set at step S43, the processing of step S32 and after in FIG. 7 may be implemented in the respective information storage devices so as to select a to-be-assigned end point.

Figure 10:
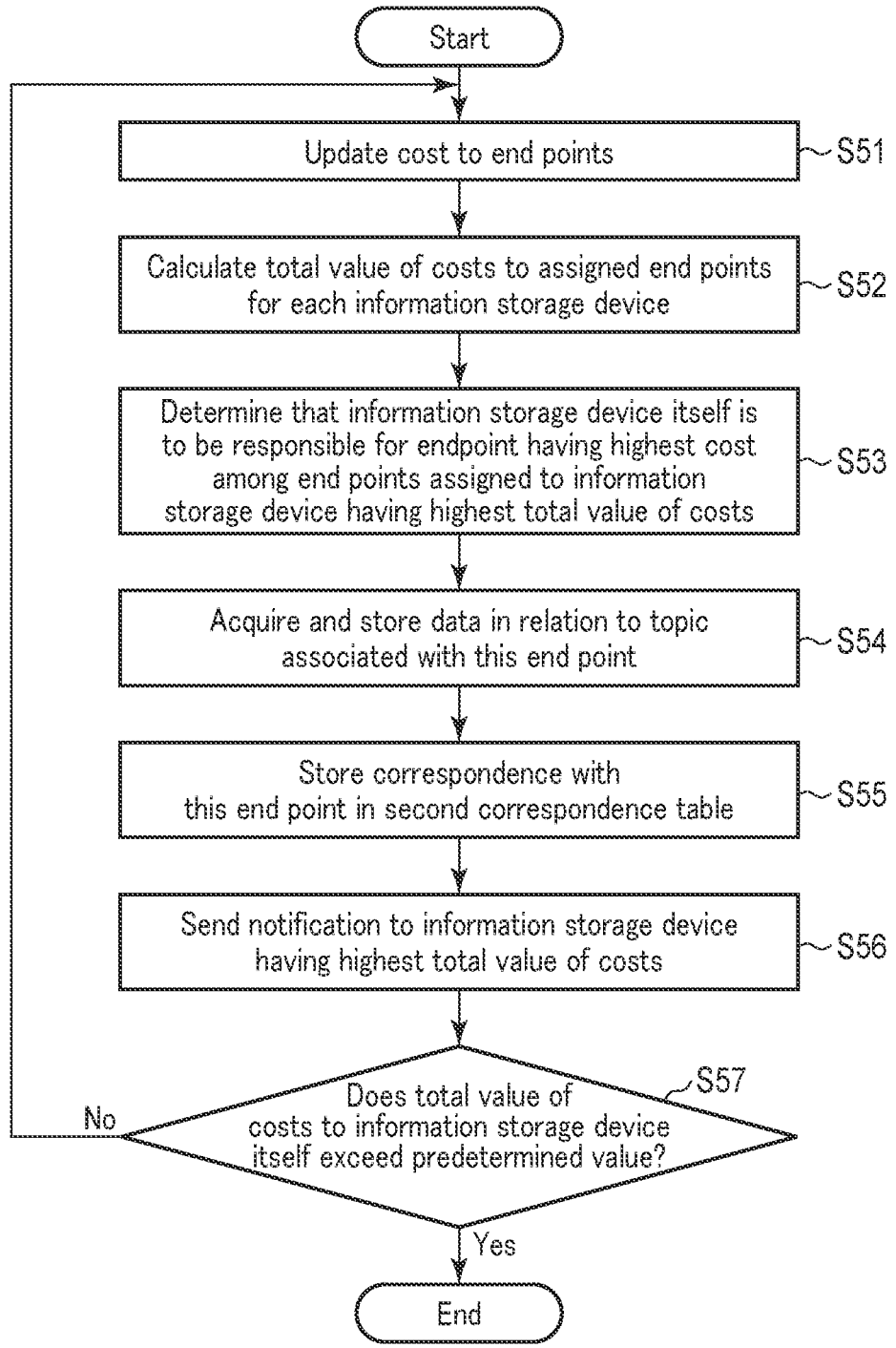
FIG. 10 is a flowchart showing an example of the selection process implemented by the control unit of the information storage device illustrated in FIG. 2 for selecting, when an information storage device is added to the network system shown in FIG. 1, a to-be-assigned information reception device.

(5) Selection Process for Allocation of Information Reception Devices when New Information Storage Device is Added FIG. 10 is a flowchart showing an example of a process of selecting an information reception device to be assigned, where the process is implemented, when an information storage device is added to the network system of FIG. 1, by the control unit 11A of the information storage device 1A in FIG. 2 and the control unit 11E of the added information storage device 1E. FIG. 11 is a diagram showing the state of updating the second correspondence table of FIG. 4 in accordance with the selection process of a to-be-assigned information reception device shown in FIG. 10.

First, at step S51, the control unit 11A updates the cost to the end points on the second correspondence table stored in the shared setting storage unit 122A when handling the end points, under the control of the correspondence updating unit 1153A. The update process may be implemented based on a notification of the frequency of access to the end point per unit time, or on the amount of processing per unit time calculated, where the calculated value is obtained by calculating the amount of processing per unit time that has increased in accordance with handling of this end point at the information storage device.

At step S52, the control unit 11A calculates the total value of costs to the end points assigned to each of the information storage devices on the second correspondence table stored in the shared setting storage unit 122A, under the control of the correspondence updating unit 1153A. The calculation process may be calculation, at each of the information storage devices, of the total value of the costs to the end points associated with the respective information storage device, or calculation, at a single information storage device, of the total value of the costs to the end points associated with a plurality of information storage devices.

At step S53, the control unit 11E of the added information storage device 1E refers to the second correspondence table stored in the shared setting storage unit 122E, and determines that the added information storage device 1E is to be responsible for the end point #2, which is the end point having the highest cost among the end points assigned to the information storage device 1B having the highest total value of the calculated, costs in FIG. 11, under the control of the target device selecting unit 1151B.

At step S54, the control unit 11E of the added information storage device 1E first reads the first correspondence table, stored in the shared setting storage unit 122E under the control of the data write unit 111E. Based on this first correspondence table, the data transmitted together with the identifiers corresponding to the topics #1 and #2 that are associated with the assigned end point #2 is acquired from the broker 3 from among the data transmitted by the information transmission devices 2A, 2B, 2C, 2D, 2E and 2F, and the acquired data is stored in the data storage unit 121E of the storage unit 12E.

At step S55, the control unit 11E of the added information storage device 1B enters the correspondence between this information storage device 1E and the assigned end point #2 into the second correspondence table stored in the shared setting storage unit 122E, under the control of the correspondence updating unit 1153E.

At step S56, the control unit 11E of the added information storage device 1E sends a notification to the information storage device 1B, which is the information storage device having the highest total value of costs as calculated above. In response to the notification, the information storage device 1B may deallocate its correspondence with the end point #2, which is now assigned to the information storage device 1E, so as to no longer acquire the data transmitted together with the identifier associated with the end point #2, and may clear this correspondence from the second correspondence table.

At step S57, the control unit 11E of the added information storage device 1E calculates the total value of the costs to the end point associated with the information, storage device 1E that the control unit 11E belongs to on the second correspondence table stored in the shared setting storage unit 122B, and determines whether or not the total value of the calculated costs exceeds a predetermined value, under the control of the correspondence updating unit 1153E, It is determined, for example, whether or not the total value of the calculated costs exceeds (sum of the costs to the end points)×(redundancy/number of information storage devices). For example, in the example of the second correspondence table in FIG. 9, whether or not the total value exceeds (6+8+4+6)×2/5 is determined. As a result of this determination, if the total value of the calculated costs does not exceed a predetermined value, the processing of step S51 and after is repeated.

(Effects)

As described above in detail, the first embodiment of the present invention offers the following effects.

(1) The information storage device 1A determines, for example, the end point #1 as the end point assigned to the information storage device 1A, based on the information indicating the correspondence between the information storage device and the end point assigned to the information storage device, under the control of the data write unit 111A. The first correspondence table stored in the shared setting storage unit 122A for associating the end points with the identifiers indicating the types of data acquired by the end points is read under the control of the data write unit 111A; the data transmitted together with the identifier corresponding to the topic #2 that is associated with the assigned end point #1 is acquired from the broker 3 based on the first correspondence table from among the data transmitted by the information transmission devices 2A, 2B, 2C, 2D, 2E and 2F; and the acquired data is stored in the data storage unit 121A. The correspondence between the information storage device 1A and the assigned end point #1 is entered into the second correspondence table stored in the shared setting storage unit 122A under the control of the correspondence updating unit 1153A.

With each information storage device configured to autonomously acquire data as described above, the data can be stored in multiple information storage devices in a distributed manner, without the need to duplicate or transmit/receive the data between the information storage devices. This realizes a distributed information storage system in which the write performance per information storage device during data storage is prevented from being lowered. In addition, if the information indicating the correspondence between the information storage devices and the end points assigned to the information storage devices Is set such that one end point is assigned to two or more information storage devices, data redundancy can be ensured over multiple information storage devices, thereby achieving the fault tolerance of the distributed information storage system.

(2) In the information storage device 1A, a data request transmitted from an information reception device such as the information reception device 4A, 4B, 4C or 4D together with an identifier indicating this information reception device is acquired under the control of the relay determination unit 113A. Whether or not the acquired data request is transmitted from an end point assigned to the information storage device 1A is determined under the control of the relay determination unit 113A. If it is determined that the acquired data request is transmitted, for example, from the end point #1 assigned to the information storage device 1A, the data stored in the data storage unit 121A for the end point #1 is read out, and the read-out data is output to the information reception device 4A corresponding to the end point #1 that has sent the data request, under the control of the data output unit 112A. On the other hand, if it is determined that the acquired data request is transmitted, for example, from the end point #2 which is not assigned to the information storage device 1A, the information storage device responsible for the end point #2 that has sent the data request is determined based on the second correspondence table stored in the shared setting storage unit 122A, under the control of the relay determination unit 113A. Thereafter, the data request is output to at least one of the information storage device 1B and the information storage device 1C, which are determined as the information storage devices responsible for the end point #2 that has sent the data request, under the control of the relay unit 114A. Then, the data stored in at least one of the information storage device 1B and the information storage device 1C responsible for the end point #2 that has sent the data request is acquired, under the control of the relay unit 114A. The acquired data is output to the information reception device 4B corresponding to the end point #2 that has sent the data request, under the control of the data output unit 112A.

Accordingly, the information reception device can acquire the desired data, whichever information storage device the information reception device accesses.

(3) The information storage device 1A refers to the second correspondence table stored in the shared setting storage unit 122A, and reads the time point "10345681" stored in relation to another information storage device 1D responsible for the assigned end point #1 and the time point "12345679" stored in relation to another information storage device 1B responsible for the assigned end point #4, under the control of the correspondence monitoring unit 1152A. For each of the read-out time points "12345679" and "10345681", it is determined, under the control of the correspondence monitoring unit 1152A, whether or not a predetermined time has elapsed since these time points were entered. The correspondence of the information storage device 1D having the time point "10345681", from which the predetermined time has elapsed, with the end point is cleared from the second correspondence table stored in the shared setting storage unit 122A, and a standby flag is set to the end points #1 and #3, for which the correspondence has been cleared, under the control of the correspondence updating unit 1153A. In the second correspondence table stored in the shared setting storage unit 122A, the time point "12345678" stored in relation to the information storage device 1A, which is the information storage device of the shared setting storage unit 122A, is updated under the control of the correspondence updating unit 1153A.

In general, even if a normal operation has been confirmed for an information storage device, the device may become unable to operate properly for some reason, as the operation time elapses. As described above, by clearing the correspondence with regard to an information storage device associated with an end point in accordance with the time reference, an information storage device that is not normally operating can be prevented from taking on responsibility for the end point. Thus, the reliability of the entire distributed information storage system can be improved. Furthermore, for the information storage device that has performed the above-described process of monitoring the correspondence table, its operation is checked at the same time as the monitoring process. By updating the time points on the second correspondence table as described above, the correspondence for a normally operating information storage device can be prevented from being cleared, and the efficiency of the distributed information storage can be prevented from being lowered.

(4) When the information reception device 4E is to be added to the network system, a row or column for the end point #5 corresponding to the information reception device 4E is added to the second correspondence table stored in the shared setting storage unit 122A in the information storage device 1A, with a standby flag being set and without the correspondence with any information storage device entered, under the control of the correspondence updating unit 1153A. The second correspondence table stored in the shared setting storage unit 122A is read out, and the to-be-assigned end point is selected from the end points for which the standby flag is set, under the control of the target device selecting unit 1151A. Based on the first correspondence table stored in the shared setting storage unit 122A, the data transmitted together with the identifier associated with the selected end point is acquired from the data transmitted by the information transmission devices 2A, 2B, 20, 2D, 2E and 2F, under the control of the data write unit 111A. The correspondence between the information storage device 1A and the selected end point is entered into the second correspondence table stored in the shared setting storage unit 122A, under the control of the correspondence updating unit 1153A.

Furthermore, when the information storage device 1E is added to the network system, the total value of the calculated costs to the end points assigned to an information storage device is calculated for each information storage device on the second correspondence table stored in the shared setting storage unit 122A, under the control of the correspondence updating unit 1153A. In the added information storage device 1E, the second correspondence table of the shared setting storage unit 122E is referred to, and the end point #2, which has the highest cost among the end points assigned to the information storage device 1B having the highest total value of the calculated costs, is determined as the assigned end point, under the control of the target device selecting unit 1151E. Under the control of the data write unit 111E, the first correspondence table stored in the shared setting storage unit 122E is read out, and the data transmitted together with the identifiers corresponding to the topics #1 and #2 that are associated with the assigned end point #2 is acquired from the broker 3 based on this first correspondence table, from among the data transmitted by the information transmission devices 2A, 2B, 2C, 2D, 2E and 2F. Under the control of the correspondence updating unit 1153E, the correspondence between the information storage device 1B and the assigned end point #2 is entered into the second correspondence table stored in the shared setting storage unit 122E.

As discussed above, the system can be provided with a scaling-out property that allows for the addition of an information reception device and information storage device, without the need to transmit and receive data between the information storage devices at the time of scaling out. As a result, a distributed information storage system can be achieved which is provided with a scaling-out property and which can prevent the write performance per information storage device from being lowered even at the time of scaling out.

(5) After the correspondence with the assigned end point #2 is entered into the second correspondence table, the added information storage device 1E sends a notification to the information storage device 1B having the highest total value of the calculated costs. Furthermore, the added information storage device 1E calculates the total value of the costs to the end points associated with the information storage device 1E itself, and determines whether or not the total value of the calculated costs exceeds a predetermined value.

For this reason, the information storage device 1B receiving the notification deallocates the correspondence with the end point #2, which is now assigned to the added information storage device 1E, so as to no longer receive, the data for the end point #2 which is deallocated in regard to the correspondence. In this manner, the large load on an information storage device can be reduced. In addition, the added information storage device 1E may handle an additional end point depending on the above determination result, thereby smoothing out the load applied onto the information storage devices.

Other Embodiments

The present invention is not limited to the above embodiment. For example, the processes implemented in connection with the correspondence table, which have been explained in the above operation flow as being implemented by any information storage device, including the process of selecting an information reception device to be assigned, the process of updating the correspondence tables, the process of updating the costs on the second correspondence table, and the process of calculating the total value of the costs, may be configured to be implemented by the setting management device. With the processes implemented by the setting management device, the information shared by a plurality of information storage devices can be collectively managed, or in other words, the distributed information storage system can be collectively managed. In the above embodiment, the correspondence between an information reception device and an information storage device is entered into the second correspondence table after the process of writing data in each information storage device. The correspondence, however, may be entered before the data write process. Moreover, in the embodiment, examples of the information storage device selecting an information reception device to be assigned based on a standby flag on the second correspondence table and selecting an information reception device to be assigned based on the costs to the end points on the second correspondence table are described. The implementation of such a selection process, however, is not limited to the situation described in the embodiment. The process of selecting an information reception device to be assigned may be performed in any situation, based on any combination of the methods described in the embodiments.

The types and configurations of an information storage device and setting management device, and the configurations of the first and second correspondence tables may be modified in various manners without departing from the gist of the present invention.

The present invention should not be limited to the above-described first embodiment as it is, but may be embodied with modifications to the components, without departing from the scope of the invention at the implementation stage. In addition, various inventions may be constituted by appropriately combining a plurality of components disclosed in the first embodiment. For example, some components may be omitted from the components shown in the first embodiment. Furthermore, the components of different embodiments may be suitably combined.

The invention claimed is:

1. A distributed information storage system comprising a plurality of data storage devices configured to conduct data communication with data transmission devices and data receiving devices,
each data storage device of the plurality of data storage devices comprising:
a data acquiring unit configured to acquire data transmitted together with an identifier indicating type of data transmitted from a data transmission device corresponding to an identifier indicating a data receiving device assigned to the data storage device from among data transmitted from the data transmission devices, based on a first correspondence table associating identifiers indicating the data receiving devices and identifiers indicating types of data acquired by the data receiving devices and a second correspondence table indicating a correspondence between identifiers indicating the data storage devices and identifiers indicating the data receiving devices assigned to the data storage devices, the first correspondence table and the second correspondence table being shared among the data storage devices;
a storage medium configured to store the acquired data;
a request acquiring unit configured to acquire a data request from the data receiving device;
a determining unit configured to determine whether or not the acquired data request is transmitted from the data receiving device assigned to the data storage device; and
an output unit configured to output data stored in the storage medium to the data receiving device assigned to the data storage device when the acquired data request is determined as being acquired from the data receiving device assigned to the data storage device,
wherein the determining unit determines a data storage device responsible for a data receiving device that is a sender of the data request based on the second correspondence table, when the acquired data request is not acquired from the data receiving device assigned to the data storage device,
each of the data storage devices further comprises a relay unit configured to acquire data stored in the storage medium of the data storage device that is determined as the data storage device responsible for the data receiving device that has sent the data request, and the output unit outputs the acquired data via the relay unit to the data receiving device that has sent the data request.

2. The distributed information storage system according to claim 1, further comprising a management device configured to perform initial setting or data access for the first correspondence table or the second correspondence table shared among the data storage devices.

3. The distributed information storage system according to claim 1, wherein each of the data storage devices comprises:
a correspondence updating unit configured to, when a data receiving device is added, enter the to-be-added data receiving device into the second correspondence table, without a correspondence with a data storage device; and a selecting unit configured to select a to-be-assigned data receiving device by referring to the second correspondence table, from among data receiving devices having no correspondence with a data storage device, wherein the correspondence updating unit enters a correspondence with the selected data receiving device into the second correspondence table.

4. The distributed information storage system according to claim 1, wherein the second correspondence table further stores a time point at which the correspondence with the data receiving device is entered, for each of the data storage devices, each of the data storage devices further comprises:

a correspondence monitoring unit configured to determine whether or not a predetermined time has elapsed after a time point is entered in relation to another data storage device responsible for the assigned data receiving device, by referring to the second correspondence table; and a correspondence updating unit configured to, when it is determined that the predetermined time has elapsed after the time point is entered, clear the correspondence of the data storage device subjected to the determination with the data receiving device from the second correspondence table, and update the time point entered in relation to the data storage device itself on the second correspondence table.

5. The distributed information storage system according to claim 1, wherein each of the data storage devices further comprises a calculating unit configured to calculate a total value of costs to assigned data receiving devices, for each data storage device on the second correspondence table, when a data storage device is added to the distributed information storage system, the added data storage device further comprises:

a selecting unit configured to select a data receiving device having a highest cost as a to-be-assigned data receiving device among data receiving devices assigned to a data storage device having a largest total value of the calculated costs;

a correspondence updating unit configured to enter a correspondence with the selected data receiving device into the second correspondence table.

6. The distributed information storage system according to claim 5, wherein the cost represents a frequency of access to the data receiving device per unit time.

7. The distributed information storage system according to claim 5, wherein the cost represents an increased operation amount at the data storage device responsible for the data receiving device.

8. The distributed information storage system according to claim 1, wherein the first correspondence table is updated when the data transmission devices are changed, or the types of data requested by the data receiving device are changed.

9. The distributed information storage system according to claim 1, wherein the second correspondence table is updated when the data receiving devices are changed, or the data storage devices are changed.

10. The distributed information storage system according to claim 1, wherein the first correspondence table is associated with the second correspondence table by the data receiving device.

11. A distributed information storage method to be implemented by a plurality of data storage devices in a distributed information storage system, which includes the data storage devices configured to conduct data communication with data transmission devices and data receiving devices, the method comprising:

acquiring data transmitted together with an identifier indicating type of data transmitted from a data transmission device corresponding to a data receiving device assigned to a data storage device from among data transmitted from the data transmission devices, based on a first correspondence table associating identifiers indicating the data receiving devices and identifiers indicating types of data acquired by the data receiving devices and a second correspondence table indicating a correspondence between identifiers indicating the data storage devices and identifiers indicating the data receiving devices assigned to the data storage devices, the first correspondence table and the second correspondence table being shared among the data storage devices;

storing the acquired data;

acquiring a data request from the data receiving device;

determining whether or not the acquired data request is transmitted from the data receiving device assigned to the data storage device;

outputting data stored in the storage medium to the data receiving device assigned to the data storage device when the acquired data request is determined as being acquired from the data receiving device assigned to the data storage device;

determining a data storage device responsible for a data receiving device that is a sender of the data request based on the second correspondence table, when the acquired data request is not acquired from the data receiving device assigned to the data storage device; and acquiring data stored in the storage medium of the data storage device that is determined as the data storage device responsible for the data receiving device that has sent the data request, and outputting the acquired data via the relay unit to the data receiving device that has sent the data request.

12. A non-transitory computer-readable storage medium having a program stored thereon which controls a computer to execute the distributed information storage method according to claim 11.

* * * * *